United States Patent [19]

Canady

[11] 4,369,007
[45] Jan. 18, 1983

[54] FLY CUTTER TOOL

[76] Inventor: Edward Canady, 3244 N. Cicero, Chicago, Ill. 60641

[21] Appl. No.: 137,731

[22] Filed: Apr. 7, 1980

[51] Int. Cl.³ ............................ B23C 3/02; B23B 5/00
[52] U.S. Cl. ...................................... 409/190; 82/1.2; 82/2 E; 279/6; 408/152; 408/181; 409/191
[58] Field of Search ............... 409/190, 191, 235, 206, 409/204, 305, 319; 408/152, 158, 181, 180; 279/6; 82/2 E, 1.2

[56] References Cited

U.S. PATENT DOCUMENTS

| 508,640 | 11/1893 | Riddell | 409/191 |
|---|---|---|---|
| 1,138,423 | 5/1915 | Swanberg | 82/2 E |
| 1,439,190 | 12/1922 | Pritchard | 279/6 |
| 2,043,679 | 6/1936 | Tarasuic | 82/2 E X |
| 2,093,743 | 9/1937 | Steiner | 82/2 E X |
| 2,358,741 | 9/1944 | Shelby | 408/181 X |
| 2,460,092 | 1/1949 | Lacey et al. | 82/1.2 |
| 2,484,480 | 10/1949 | Anderson | 408/181 |
| 2,521,619 | 9/1950 | Weld | 82/1.2 |
| 2,833,169 | 5/1958 | Briney, Jr. et al. | 276/6 |
| 3,110,200 | 11/1963 | Sturmberg | 408/181 X |
| 3,125,903 | 3/1964 | Briney, Jr. et al. | 408/151 |
| 3,169,416 | 2/1965 | Carlson et al. | 408/181 X |
| 3,344,693 | 10/1967 | Scholl | 408/181 X |
| 3,348,437 | 10/1967 | Pichette | 408/158 X |
| 3,371,581 | 3/1968 | White | 409/190 X |
| 3,530,745 | 9/1970 | Milewski | 408/158 |
| 3,599,517 | 8/1971 | Muller | 408/152 X |
| 3,654,826 | 4/1972 | Gersch | 82/1.2 |
| 3,966,347 | 6/1976 | Watson | 408/180 |
| 4,072,083 | 2/1978 | Cesal | 408/180 |

FOREIGN PATENT DOCUMENTS

| 198194 | 8/1906 | Fed. Rep. of Germany | 408/152 |
|---|---|---|---|
| 2030870 | 12/1970 | Fed. Rep. of Germany | 48/152 |
| 991532 | 10/1951 | France | 276/6 |

Primary Examiner—William R. Briggs
Attorney, Agent, or Firm—Jacques M. Dulin

[57] ABSTRACT

An adjustable fly cutter tool for cutting and forming blanks of metal, wood, plastic, glass, etc. The tool can be used on a conventional lathe or milling machine, and enables the operator to continuously change the depth of the cut into the blank without slowing or stopping the tool operation. The cutting tool is mounted on a threaded bar movable in the x and/or y direction and is axially received in a threaded advancement gear which is actuated by a ratchet assembly that extends or retracts the position of the threaded bar holding the cutter as the main gear is rotated. A non-rotating lever journalled around the cutter drive shaft activates the assembly.

7 Claims, 7 Drawing Figures

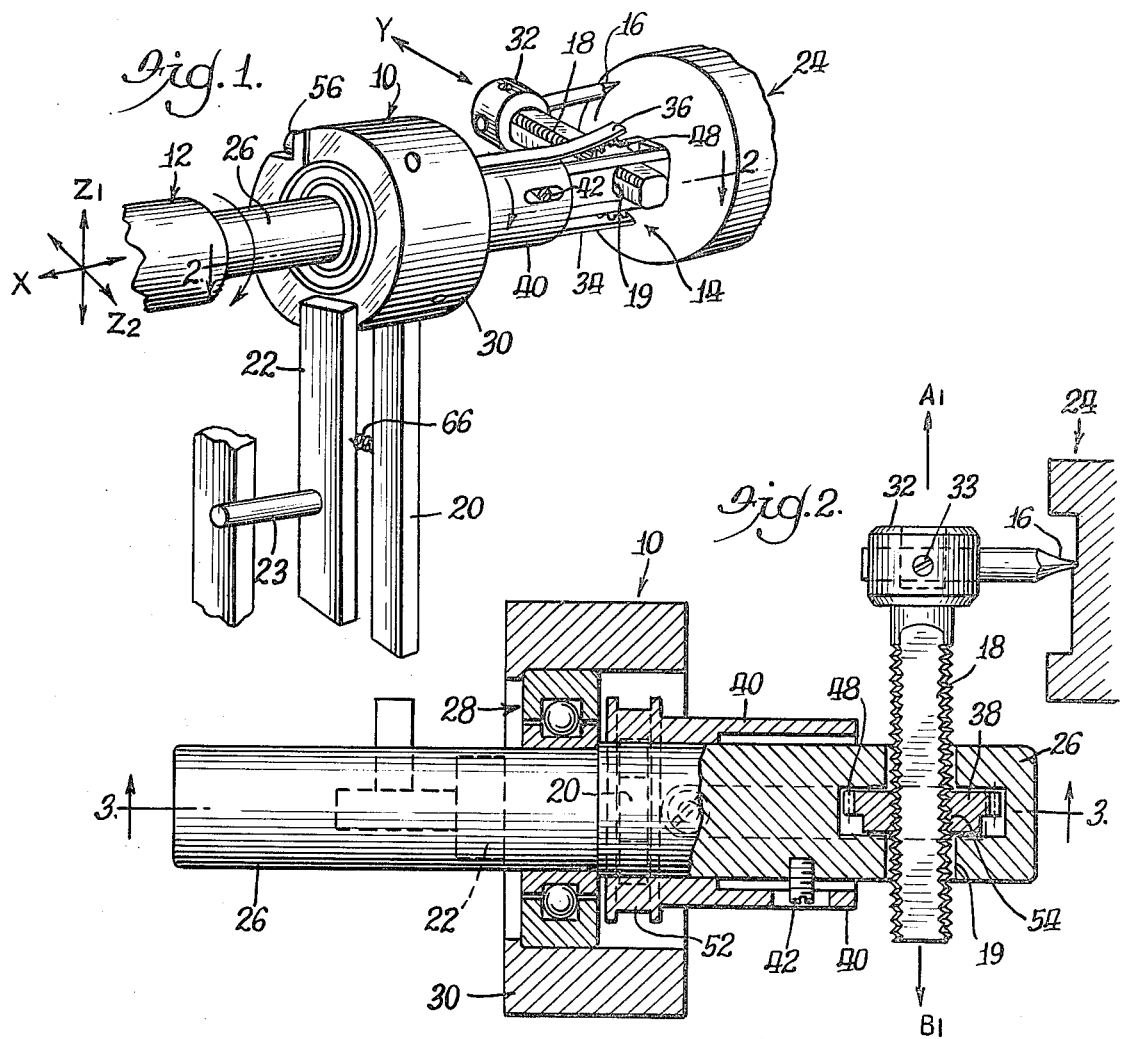
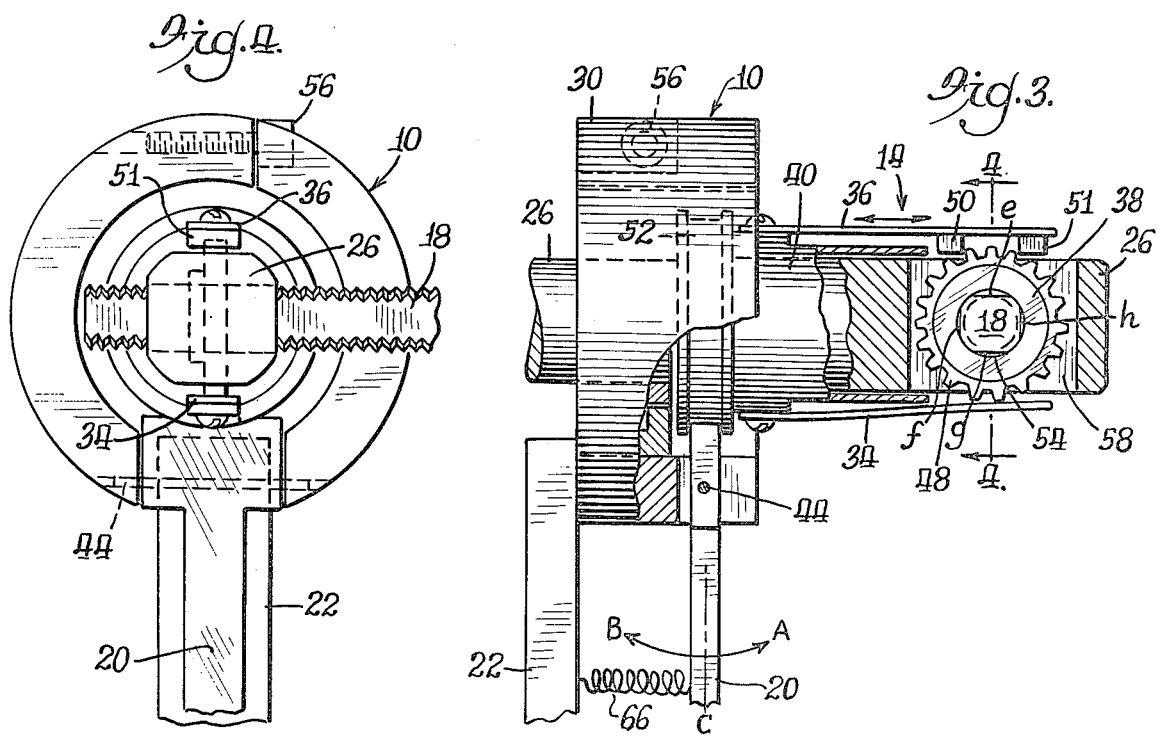

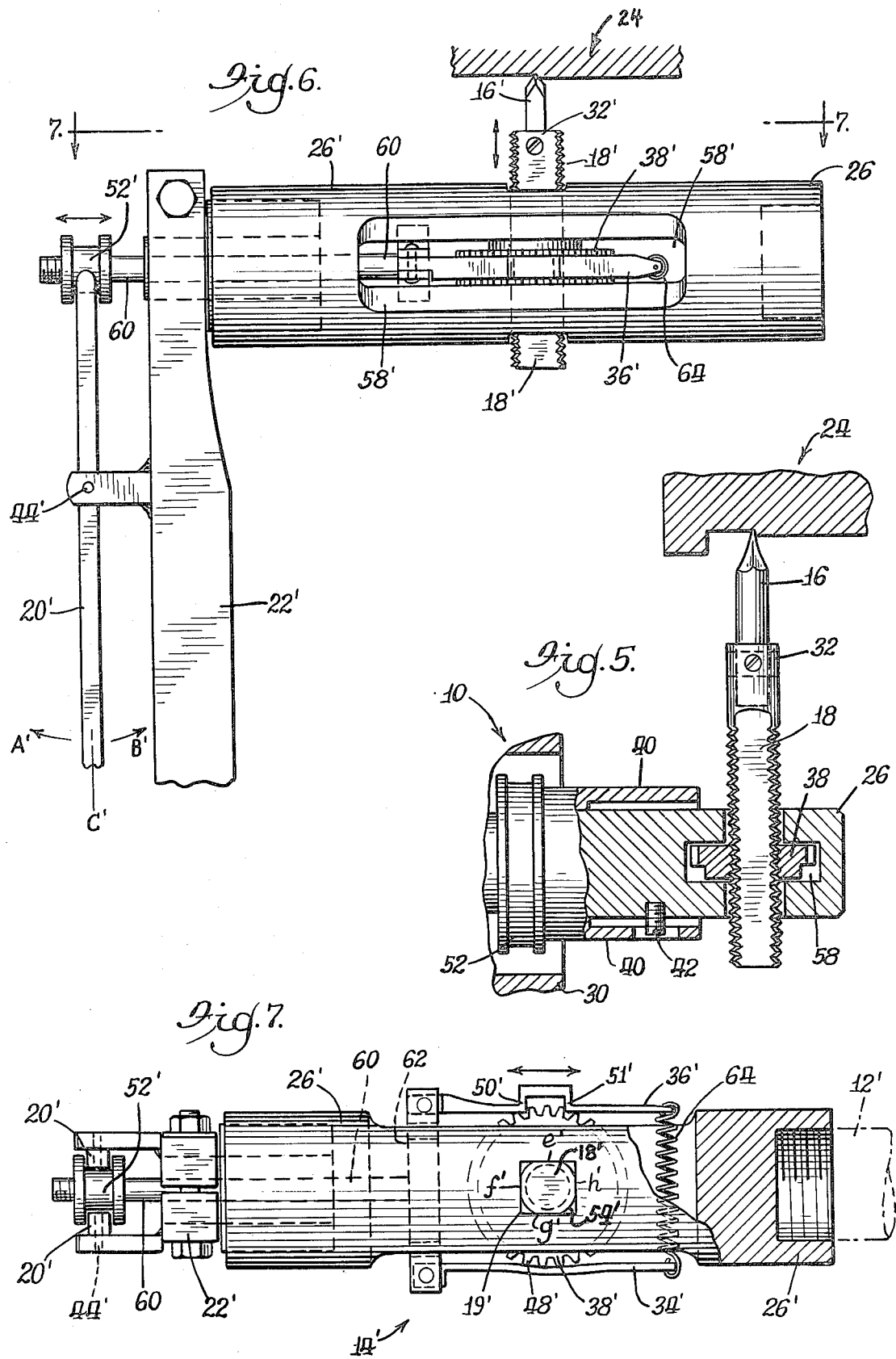

FLY CUTTER TOOL

FIELD OF THE INVENTION

This invention relates to fly cutter tools for use in lathe or milling operations, having an adjustable cutter for varying the diameter and depth of the cut. More precisely, the invention relates to an improved fly cutting tool which in addition to being axially adjustable for depth of cut by advancing a cutter drive shaft, is radially continuously adjustable without stopping the machine operation.

BACKGROUND

Conventional milling machines have a cutter mounted on a cutter drive shaft which is axially adjustable. As the tool rotates it cuts a groove or swath in the workpiece. If the workpiece is small, it may be mounted on a bed movable to a limited extent in an x and a y direction. Motion in the z direction is provided by axial advancement of the cutter drive shaft. This set-up is suitable for pieces of limited, relatively small size, weight, and regular configuration.

Where the piece is large, so that it will not fit on the bed in a manner that it can be controllably moved in the x or y direction, the cutting head must be stopped, the cutter repositioned, and a second groove cut. Subsequent adjacent grooves must be cut by the stop/adjust, stop/adjust, stop/adjust method, which is laborious and slow.

Further, a major cost of the milling machine is in the bed, including slides, hold downs, and the screw threaded x/y position assembly. The bed must support the mass of the work and must be smoothly and accurately positionable to insure precision of cut. Similarly, when lathes are set up to rotate the tool against a fixed piece, the work holder limits the size of the work that can be shaped. The same stop/adjust process must be employed to remove radially contiguous areas of metal.

While the prior art shows adjustable cutters which permit adjustment during the cutting process, they require a substantial number of moving parts and are of a more complex manufacture. For example, in the Milewski Pat. No. 3,530,745, a cam assembly with various springs, fasteners, cartridges, cutters and other elements is required to achieve the desired movement of the cutting edge.

There is thus a need for a simple fly cutting tool that is adjustable in the x, y and z directions during lathe operation. Such a simple, adjustable fly cutter tool that was continuously or intermittently positionable in the x, y and z directions during rotation of the tool would render milling machines and lathes more versatile, capable of handling larger stationary blanks, capable of working on irregular blanks, cheaper to manufacture in not requiring complex work-holding beds with their precision x and y motion assemblies. Further, such a fly cutter tool that is continuously adjustable during operation would save substantial labor time and cost in milling and lathe operations on stationary work pieces. These needs are satisfied by the instant invention.

OBJECTS

It is an object of the invention to provide a simple cutting tool which itself permits continuous x, y and z directional adjustment of the cutter during machining operation.

It is another object of the invention to provide a method of continuously machining a stationary work piece by continuous or intermittant adjustment of a tool holder in the x, y and z directions including threaded advancement of a cutter tool holder bar assembly.

It is still another object of the invention to provide an adjustable cutting tool capable of predetermined incremental adjustment in a continuous or intermittent fashion, by hand or automatically.

These and other objects and advantages of the invention will become readily apparent from the detailed description and drawings.

BRIEF DESCRIPTION OF THE DRAWINGS

The accompanying drawings illustrate the invention in which:

FIG. 1 is a front perspective view of a first embodiment of the cutter of this invention in position cutting a work piece;

FIG. 2 is a top, axial view, partly in section of the cutter tool along line 2—2 of FIG. 1;

FIG. 3 is a front axial view partly in section, of the tool assembly along line 3—3 of FIG. 2;

FIG. 4 is an end view of the cutting tool assembly of the invention along line 4—4 of FIG. 3;

FIG. 5 shows a cross-sectional view of the cutter assembly.

FIG. 6 is a top view of a second embodiment of the invention with the cutter oriented radially for bore cutting or finishing, e.g., on a lathe.

FIG. 7 is a side view of the second cutter embodiment of FIG. 6.

SUMMARY OF THE INVENTION

The invention, through the use of a ratchet and threaded gear arrangement, allows a cutting tool to be adjustable during the machining process and without stopping the machine. Adjustment is accomplished in the x and y plane through a simple, hand-operated lever assembly. The lever assembly comprises a non-rotating component engaged with a rotating ratchet and cutter assembly.

DESCRIPTION OF THE PREFERRED EMBODIMENT

The invention is described in more detail with reference to the drawings by way of example and not by way of limitation of the invention. The embodiment of FIGS. 1-5 is particularly useful for milling or lathe operations of surface cutting, shaping and finishing of a fixed workpiece. The embodiment of FIGS. 6 and 7 is particularly useful for bore finishing.

FIG. 1 is a perspective of the presently preferred first embodiment of the fly cutter, having journal 10 receiving drive shaft 26 passing therethrough. Shaft 26 receives ratchet assembly 14 at one end, and the other end is in engagement with drive chuck 12. Cutter 16 is attached to radially projective threaded adjustment bar 18 by cutter holder 32. A pair of levers 20 and 22 actuate the ratchet assembly 14. Bar 22 is fastened to journal housing 30, and moveable bar 20 is pivoted therein on pin 44. Reference bar 22 optionally may have a pin 23 abut against a portion of the milling machine or lathe to prevent rotation thereof.

Referring now to FIG. 2, bearing 28 in journal housing 30 allows the rotation of drive shaft 26 while permitting journal 10 to remain stationary. Since reference bar 22 and lever 20 are both connected to the journal 10, they also will remain stationary as drive shaft 26 is rotated within journal housing 30.

Sleeve 40 as shown in FIGS. 2 and 3 is a hollow cylinder having a cam spool 52 and is positioned around drive shaft 26. Sleeve 40 has a pair of ratchet activators 34 and 36 secured thereto. Drive ratchet 36 has ratchet teeth 50 and 51 which engage gear teeth 48 on advancement gear 38. Ratchet spring bar 34 is also secured to sleeve 40 and is spring biased to apply frictional force against advancement gear 38 so that the ratchet assembly 14 can be returned to its original position without backward rotation of the gear 38. Sleeve screw 42 prevents sleeve 40 from rotating about the longitudinal axis of drive shaft 26, and allows sleeve 40 to move reciprocally a predetermined axial distance along drive shaft 26.

FIG. 3 shows in more detail the working arrangement of ratchet assembly 14. Reference bar 22 remains stationary as lever 20 is moved in either of the directions shown by arrows A and B. The end of lever 20 acting against one of the shoulders of cam spool 52 causes sleeve 40 to move axially of drive shaft 26. When sleeve 40 is moved in this manner, drive ratchet 36 moves, causing drive tooth 50 or 51 to engage gear teeth 48 of advancement gear 38, rotating it. As advancement gear 38 rotates, threaded adjustment bar 18 is moved radially a distance corresponding to the incremental turn of the threaded advancement gear 38. Threaded adjustment bar 18 comprises a square bar with the four corners rounded and threaded leaving the four opposing surfaces, e, f, g, and h, flat and allowing threaded adjustment bar 18 to be inserted through corresponding square opening 19 is cutter drive shaft 26, thus preventing threaded adjustment bar 18 from turning about its axis as advancement gear 38 rotates.

Threaded adjustment bar 18 is held in drive shaft 26 by the mating threaded engagement between threaded hole 54 in advancement gear 38 and threaded adjustment bar 18. Advancement gear 38 in turn is retained within gear housing 58 by threaded adjustment bar 18. Since threaded adjustment bar 18 cannot turn about its longitudinal axis as gear 38 is rotated, gear rotation activates the threaded relationship between threaded adjustment bar 18 and threaded hole 54, causing adjustment bar 18 to move radially in or out along its longitudinal axis in proportion to the amount of rotation and direction of rotation of advancement gear 38.

Successive incremental rotational movements of advancement gear 38 are accomplished by moving lever 20 in the direction of either arrow A or B, back to reference line C and then again in the direction of arrow A or B. This repeated motion causes sleeve 40 and drive ratchet 36 to move axially back and forth, which in turn operates the ratchet and gear assembly, moving cutter 16 the desired amount radially in or out.

As lever 20 returns to the reference line C, drive teeth 50 and 51 are disengaged from gear teeth 48 and are repositioned in mating engagement with the next set of gear teeth 48. This repositioning allows advancement gear 38 to rotate further in the desired direction as the movement of lever 20 is repeated.

For example: in FIG. 3, as lever 20 is moved in the direction of arrow B, a force is exerted against the right shoulder of cam spool 52. This force causes sleeve 40 and drive ratchet 36 to move to the right. Drive teeth 50 and 51 are moved similarly to the right, rotating advancement gear 38 clockwise. This clockwise movement of advancement gear 38 causes the threaded engagement between threaded hole 54 and threaded adjustment bar 18 to move threaded adjustment bar 18 in the direction of arrow $B_1$, seen in FIG. 2. Moving lever 20 back to reference line C and then again in the direction of arrow B repeats the above sequence with a new set of gear teeth 48, and extends threaded adjustment bar 18 an increment further in the direction of arrow $B_1$.

If lever 20 is moved in the direction of arrow A in FIG. 3, the above detailed sequence works in reverse, turning advancement gear 38 in a counterclockwise direction and causing threaded adjustment bar 18 to move in the direction of arrow $A_1$ in FIG. 2. Any movement of threaded adjustment bar 18 causes equal movement of cutter 16.

An important feature of the ratchet assembly 14 is ratchet spring bar 34 which exerts a frictional force against advancement gear 38. This force prevents advancement gear 38 from turning in the opposite of the desired direction as the ratchet assembly 14 is retracted. When the lever 20 is returned to reference line C, the force exerted by ratchet spring bar 34 holds advancement gear 38 stationary allowing the drive teeth to skip over the next succeeding set of gear teeth 48. Any other means of preventing backward rotation may also be used, such as an escapement mechanism.

Screw 56 secures journal housing 30 about bearing 28. Cutter holder 32 holds cutter 16 in place during the operation and is shown in this embodiment with a screw adjustment 33 for increasing or decreasing the axial length of the cutter and for allowing easy removal of the cutter. In FIG. 3 cutter 16 is shown positioned at a right angle to the longitudinal axis of the threaded adjustment bar 18.

FIG. 5 illustrates an alternative embodiment of cutter 16 position. In FIG. 5 cutter 16 is positioned along the axis of threaded adjustment bar 18 to facilitate an inside cut (such as a groove cut) on workpiece 24 as shown. FIG. 5 illustrates one of many means of positioning cutter 16 to provide for a variety of cuts.

FIGS. 6 and 7 illustrate an alternative embodiment of the cutting tool. The elements in FIGS. 6 and 7 which serve the same function as elements in the embodiment illustrated in FIGS. 1 through 5 are defined by their corresponding numbers with prime designations.

In FIG. 6 cutter 16' is shown milling workpiece 24'. Cutter 16' is held in place by cutter holder 32' secured to threaded adjustment bar 18'. The center hole of advancement gear 38' operates in threaded engagement with threaded adjustment bar 18' in the same manner as previously described. Advancement gear 38' is rotated in either a clockwise or counterclockwise direction by drive ratchet 36'. Lever 20' is operated about an axis defined by pin 44'. The end of lever 20' is held in cam spool 52'. When lever 20' is operated, a force is exerted against the shoulder spool 52' which in turn is transmitted through shaft 60 to drive ratchet 36'. In FIG. 7 cam spool 52' is shown secured to shaft 60 which extends through the center of drive shaft 26' where it is joined to transverse bar 62. Transverse bar 62 connects with drive ratchet 36' and ratchet bar 34'. Spring 64 is in tension and holds drive ratchet 36' and ratchet spring bar 34' against advancement gear 38'. Spring 64 provides the necessary friction between ratchet bar 34' and gear teeth 48' to prevent advancement gear 38' from "following" drive teeth 50' and 51' as they are re-set for a subsequent incremental change. Spring 64 also resists the centrifugal force created and exerted on drive ratchet 36' and ratchet spring bar 34' when drive shaft 26' is turned at a high speed by drive chuck 12'.

Operation of the alternative embodiment shown in FIGS. 6 and 7 is accomplished in the same manner as in the preferred embodiment. As lever 20' is operated in either the direction of arrows A' or B' and then back to reference line C', shaft 60 transmits the force exerted on cam spool 52' to drive ratchet 36'. Ratchet drive teeth 50' and 51' in mating engagement with gear teeth 48' cause advancement gear 38' to rotate. This rotation activates the threaded engagement between the central threaded adjustment bar 18' and causes threaded adjustment bar 18' to move in the desired direction. If the lever 20' is repeatedly moved from reference line C' in FIG. 6 in the direction of arrow A', cutter 16' will move away from workpiece 24'. If lever 20' is moved from reference line C' in the direction of arrow B', the cutter 16' moves further into workpiece 24'.

In both of the above embodiments an incremental change of cutter 16 depth is pre-set by the threaded relationship between threaded adjustment bar 18 and the threaded central opening of advancement gear 38. The coarser the thread, the greater the incremental change per lever 20 action. The finer the thread, the smaller the incremental change per lever 20 action. Cutter tools of a variety of thread arrangements can be used for work pieces requiring different levels of work, from coarse to fine.

The pitch of the gear teeth 48 and the internal threads 54 act in concert as multipliers. That is, if there are 50 teeth and 20 pitch to the threads, the incremental advancement is 1/100th of an inch. Thus, with appropriate teeth/thread combinations, the increments can be any desired predetermined amount, with 0.001 being typical. The assembly of this invention thus provides very precise positioning of cutter 16.

An optional element consists of spring 66 shown in FIG. 3 mounted between levers 20 and 22. Spring 66 would bias lever 20 to the position shown along reference line C after each movement of lever 20 in the direction of arrows A or B.

It should be understood that various modifications within the scope of this invention can be made by one of ordinary skill in the art without departing from the spirit thereof. I therefore wish my invention to be defined by the scope of the appended claims as broadly as the prior art will permit, and in view of this specification if need be.

I claim:

1. A rotary cutter assembly for machining operations comprising in operative combination:
   (a) a first shaft adapted to be rotatably driven about its axis;
   (b) means for holding a cutting tool mounted on said first shaft normal to said axis, said holding means being movable in a Y direction radially normal to said shaft axis;
   (c) said cutting tool holder means includes an externally threaded second shaft having means for holding a cutting tool, and having means for preventing rotation of said second shaft, said second shaft being received in a radial hole in said first driven shaft;
   (d) means for radially advancing said cutting tool holder mounted in association with said first shaft;
   (e) means for actuating said radial advancing means disposed rotationally stationary during the rotation of said first shaft, and providing for motion of said cutting tool holder outwardly or inwardly in said radial direction responsive to selectable actuation thereof;
   (f) said radially advancing means includes:
      (i) a Y-motion advancing member comprising a disc member having a central threaded aperture receiving said second threaded shaft, and said disc is disposed in a slot in said first shaft, and
      (ii) an axially slidable first lever mechanism engaging said disc member in a ratchet relationship; and
   (g) said actuating means includes a second lever mechanism engaging said first lever mechanism.

2. A cutter assembly as in claim 1 wherein said cutting tool is disposed on said second shaft axially parallel to said first shaft axis.

3. A cutter assembly as in claim 1 wherein said cutting tool is disposed on said second shaft axially parallel to said second shaft.

4. A cutter assembly as in claim 1 wherein said first shaft is movable in at least one additional direction selected from a second, X direction and a third, Z direction, each of said directions being normal to each other and said X direction being a direction coaxial of said first shaft.

5. A cutter assembly as in claim 1 wherein:
   (a) said second lever means includes a pair of lever arms, at least one of which is journalled to said first shaft.

6. A cutter assembly as in claim 5 wherein:
   (a) said first lever mechanism includes means for selectively rotating said disc member in a predetermined direction by repeated reciprocal motion of said first lever mechanism to axially move said second shaft radially outwardly or inwardly.

7. A cutter assembly as in claim 6 wherein:
   (a) said first lever means includes a spool member engaging said second lever means, said spool member having shoulders permitting selective movement of said first lever means parallel to the axis of said first driven shaft to rotate said disc member.

* * * * *